United States Patent
Kishimoto et al.

(10) Patent No.: US 11,625,632 B2
(45) Date of Patent: Apr. 11, 2023

(54) AUTOMATED GENERATION OF A MACHINE LEARNING PIPELINE

(71) Applicant: International Business Machines Corporation, Armonk, NY (US)

(72) Inventors: Akihiro Kishimoto, Castleknock (IE); Djallel Bouneffouf, Wappinger Falls, NY (US); Bei Chen, Waterville Blanchardstown (IE); Radu Marinescu, Castleknock (IE); Parikshit Ram, Atlanta, GA (US); Ambrish Rwat, Dublin (IE); Martin Wistuba, Ongar Village (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 16/851,775

(22) Filed: Apr. 17, 2020

(65) Prior Publication Data
US 2021/0326736 A1   Oct. 21, 2021

(51) Int. Cl.
*G06N 20/00* (2019.01)
*G06F 9/38* (2018.01)
(Continued)

(52) U.S. Cl.
CPC ........... *G06N 7/005* (2013.01); *G06F 9/3867* (2013.01); *G06K 9/6227* (2013.01); *G06K 9/6262* (2013.01); *G06N 20/00* (2019.01)

(58) Field of Classification Search
CPC .... G06K 9/6227; G06F 9/3867; G06N 20/00; G06N 20/105; G06N 20/08; G06N 20/005; G06N 20/003; G06N 20/10
See application file for complete search history.

(56) References Cited

U.S. PATENT DOCUMENTS

| | | | |
|---|---|---|---|
| 6,070,144 | A | 5/2000 | Ginsberg et al. |
| 9,646,262 | B2 | 5/2017 | Phillipps et al. |
| 10,387,963 | B1 * | 8/2019 | Leise ............... H04M 3/527 |

(Continued)

FOREIGN PATENT DOCUMENTS

| | | |
|---|---|---|
| WO | 2016061283 | 4/2016 |
| WO | 2019215713 | 11/2019 |

OTHER PUBLICATIONS

Peter Sugimura et al., "Building a Reproducible Machine Learning Pipeline", [Online], pp. 1-4, [Retrieved from Internet on Jun. 1, 2022], <https://arxiv.org/ftp/arxiv/papers/1810/1810.04570.pdf> (Year: 2018).*

(Continued)

*Primary Examiner* — Ziaul A Chowdhury
(74) *Attorney, Agent, or Firm* — Amin, Turocy & Watson, LLP

(57) ABSTRACT

Systems, computer-implemented methods, and computer program products to facilitate automated generation of a machine learning pipeline based on a pipeline grammar are provided. According to an embodiment, a system can comprise a memory that stores computer executable components and a processor that executes the computer executable components stored in the memory. The computer executable components can comprise a pipeline structure generator component that generates a machine learning pipeline structure based on a pipeline grammar. The computer executable components can further comprise a pipeline optimizer component that selects one or more machine learning modules that achieve a defined objective to instantiate a machine learning pipeline based on the machine learning pipeline structure.

20 Claims, 10 Drawing Sheets

(51) Int. Cl.
*G06N 7/00* (2006.01)
*G06K 9/62* (2022.01)

(56) References Cited

U.S. PATENT DOCUMENTS

| | | | |
|---|---|---|---|
| 2016/0110657 A1 | 4/2016 | Gibiansky et al. | |
| 2019/0018821 A1 | 1/2019 | Ormont et al. | |
| 2019/0018866 A1 | 1/2019 | Ormont et al. | |
| 2019/0075301 A1 | 3/2019 | Chou et al. | |
| 2019/0108417 A1 | 4/2019 | Talagala et al. | |
| 2019/0114151 A1* | 4/2019 | Jacobs | G06F 8/33 |
| 2019/0209022 A1* | 7/2019 | Sobol | A61B 5/7267 |
| 2019/0251350 A1* | 8/2019 | Shukla | G06K 9/6256 |
| 2019/0392547 A1 | 12/2019 | Katouzian et al. | |
| 2020/0005045 A1 | 1/2020 | Lloyd, II et al. | |
| 2020/0348912 A1* | 11/2020 | Katzenberger | G06F 8/31 |
| 2020/0401950 A1* | 12/2020 | Han | G06K 9/6262 |

OTHER PUBLICATIONS

Kotthoff et al., "Auto-WEKA 2.0: Automatic model selection and hyperparameter optimization in WEKA," Journal of Machine Learning Research, 2016, 5 pages.

Sabharwal et al., "Selecting Near-Optimal Learners via Incremental Data Allocation," Proceedings of the Thirtieth AAAI Conference on Artificial Intelligence, 2007, 9 pages.

Olson et al., "Automating biomedical data science through tree-based pipeline optimization," arXiv:1601.07925v1 [cs.LG], Jan. 28, 2016, 16 pages.

De Sa et al., "RECIPE: A Grammar-based Framework for Automatically Evolving Classification Pipelines," Computer Science, Mar. 2017, 17 pages.

Dechter et al., "Search Algorithms for M Best Solutions for Graphical Models," Proceedings of the Twenty-Sixth AAAI Conference on Artificial Intelligence, 2012, 7 pages.

Rakotoarison et al., "Automated Machine Learning with Monte-Carlo Tree Search," Proceedings of the Twenty-Eighth International Joint Conference on Artificial Intelligence, 2019, 8 pages.

Mohr et al., "ML-Plan: Automated machine learning via hierarchical planning," https://doi.org/10.1007/s10994-018-5735-Z, Jul. 3, 2018, 21 pages.

Wever et al., "ML-Plan for Unlimited-Length Machine Learning Pipelines," ICML AutoML Workshop, 2018, 8 pages.

Hirzel et al., "Type-Driven Automated Learning with LALE," arXiv:1906.03957v1 [cs.PL], May 24, 2019, 10 pages.

Liu et al., "An ADMM Based Framework for AutoML Pipeline Configuration," arXiv:1905.00424v5 [cs.LG], Dec. 6, 2019, 30 pages.

Auer et al., "Finite-time Analysis of the Multiarmed Bandit Problem," Machine Learning, DOI: 10.1023/A:1013689704352, May 2002, 23 pages.

Mell et al., "The NIST Definition of Cloud Computing," Recommendations of the National Institute of Standards and Technology, NIST Special Publication 800-145, Sep. 2011, 7 pages.

"H2O Driverless AI," Apr. 2, 2020, http://docs.h2o.ai/driverless-ai/latest-stable/docs/userguide/index.html, 1 page.

"Microsoft Azure, Custom Vision," Apr. 2, 2020, https://azure.microsoft.com/en-gb/services/cognitive-services/custom-vision-service/, 13 pages.

"AutoML—Microsoft Research," Apr. 2, 2020, https://www.microsoft.com/en-us/research/project/automl/, 3 pages.

"Cloud AutoML Documentation | Google Cloud," Apr. 2, 2020, https://cloud.google.com/automl/docs/, 4 pages.

Sood, et al., "NEUNETS: An Automated Synthesis Engine for Neural Network Design," https://www.ibm.com/downloads/cas/JGZONRER, arXiv:1901.06261v1 [cs.LG] Jan. 17, 2019, 14 pages.

"IBM Watson Studio," Apr. 2, 2020, https://www.ibm.com/cloud/watson-studio, 16 pages.

Harvey et al., "Limited Discrepancy Search," 1995, https://pdfs.semanticscholar.org/efa5/6b710ff3c6d8b2666971d07c311eeb6c5b40.pdf, 7 pages.

Feurer et al., "Efficient and Robust Automated Machine Learning," Advances in Neural Information Processing Systems 28 (NIPS 2015), https://papers.nips.cc/paper/5872-efficient-and-robust-automated-machine-learning, 9 pages.

\* cited by examiner

US 11,625,632 B2

AUTOMATED GENERATION OF A MACHINE LEARNING PIPELINE

BACKGROUND

The subject disclosure relates to automated generation of a machine learning pipeline, and more specifically, to automated generation of a machine learning pipeline based on a pipeline grammar.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate automated generation of a machine learning pipeline based on a pipeline grammar are described.

According to an embodiment, a system can comprise a memory that stores computer executable components and a processor that executes the computer executable components stored in the memory. The computer executable components can comprise a pipeline structure generator component that generates a machine learning pipeline structure based on a pipeline grammar. The computer executable components can further comprise a pipeline optimizer component that selects one or more machine learning modules that achieve a defined objective to instantiate a machine learning pipeline based on the machine learning pipeline structure.

According to another embodiment, a computer-implemented method can comprise generating, by a system operatively coupled to a processor, a machine learning pipeline structure based on a pipeline grammar. The computer-implemented method can further comprise selecting, by the system, one or more machine learning modules that achieve a defined objective to instantiate a machine learning pipeline based on the machine learning pipeline structure.

According to another embodiment, a computer program product facilitating an automated machine learning pipeline generation process is provided. The computer program product comprising a computer readable storage medium having program instructions embodied therewith, the program instructions executable by a processor to cause the processor to generate, by the processor, a machine learning pipeline structure based on a pipeline grammar. The program instructions are further executable by the processor to cause the processor to select, by the processor, one or more machine learning modules that achieve a defined objective to instantiate a machine learning pipeline based on the machine learning pipeline structure.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
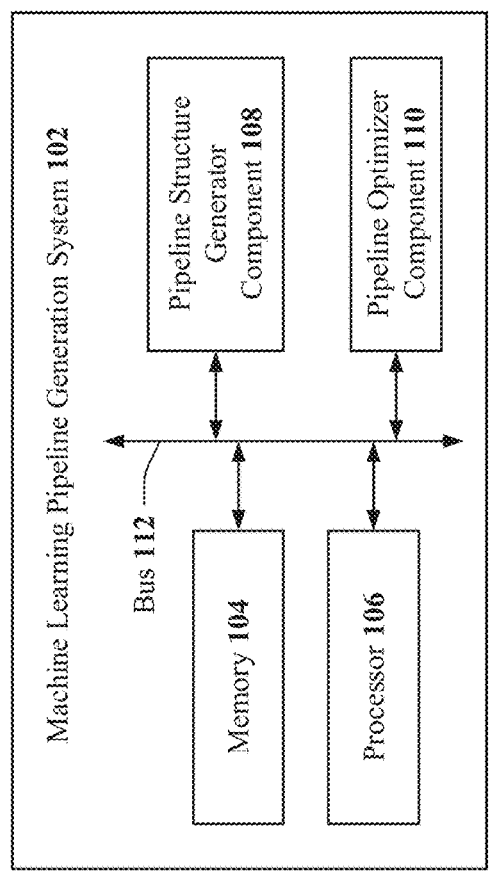
FIG. 1 illustrates a block diagram of an example, non-limiting system that can facilitate automated generation of a machine learning pipeline based on a pipeline grammar in accordance with one or more embodiments described herein.

FIG. 1 illustrates a block diagram of an example, non-limiting system 100 that can facilitate automated generation of a machine learning pipeline based on a pipeline grammar in accordance with one or more embodiments described herein. System 100 can comprise a machine learning pipeline generation system 102, which can be associated with a cloud computing environment. For example, machine learning pipeline generation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Machine learning pipeline generation system 102 and/or components thereof (e.g., pipeline structure generator component 108, pipeline optimizer component 110, ranker component 202, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by machine learning pipeline generation system 102 and/or components thereof to execute one or more operations in accordance with one or more embodiments of the subject disclosure described herein. For instance, machine learning pipeline generation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As illustrated in FIG. 1, machine learning pipeline generation system 102 can comprise a memory 104, a processor 106, a pipeline structure generator component 108, a pipeline optimizer component 110, and/or a bus 112.

In one or more embodiments, as described in detail below, machine learning pipeline generation system 102 can create a machine learning (ML) pipeline based on a pipeline grammar by implementing and/or repeating a sequence of steps in a trial-and-error manner until a desired performance is achieved. For example, machine learning pipeline generation system 102 can: 1) obtain a dataset and perform some preliminary cleanup; 2) evaluate the dataset and identify important features; 3) perform a series of data transformation steps; 4) analyze a combination of ML modules and train them on the dataset; 5) tune the hyperparameters of the selected ML modules; and/or 6) repeat step 2) to step 5) until a desired performance is achieved.

In some embodiments, machine learning pipeline generation system 102 can implement and/or repeat the sequence of steps described above automatically (e.g., without assistance from a human) In some embodiments, machine learning pipeline generation system 102 can generate a machine learning pipeline structure (e.g., a directed acyclic graph (DAG) structured machine learning pipeline structure) and/or an instantiated machine learning pipeline comprising one or more machine learning modules (e.g., one or more machine learning algorithms) based on a pipeline grammar (e.g., a pipeline structure grammar) In an example, machine learning pipeline generation system 102 can utilize a pipeline space defined by a pipeline grammar to search for and/or evaluate one or more machine learning pipeline structure candidates, thereby enabling discovery and/or evaluation of a variety of different types of machine learning pipeline structure candidates.

In some embodiments, machine learning pipeline generation system 102 can generate a machine learning pipeline structure and/or an instantiated machine learning pipeline based on a pipeline grammar by using an existing machine learning pipeline as input (e.g., an existing instantiated machine learning pipeline). In other embodiments, machine learning pipeline generation system 102 can generate a machine learning pipeline structure and/or an instantiated machine learning pipeline based on a pipeline grammar without using an existing machine learning pipeline as input. For example, machine learning pipeline generation system 102 can generate a machine learning pipeline structure and/or an instantiated machine learning pipeline based on a pipeline grammar by using input including, but not limited to, a dataset (e.g., a training dataset, an evaluation dataset, etc.), one or more machine learning modules (e.g., one or more machine learning algorithms), one or more defined criteria (e.g., a defined length of a machine learning pipeline structure), one or more defined objectives (e.g., one or more objective functions such as, for instance, a loss function, a defined prediction accuracy, etc.), and/or another type of input. In this example, such a dataset can comprise data including, but not limited to, text, images, audio, video, and/or another type of data and such one or more machine learning modules can comprise one or more various types of machine learning algorithms that can be used to instantiate a machine learning pipeline that can thereby be applied to a variety of domains and different types of datasets.

In one or more embodiments, machine learning pipeline generation system 102 can generate a machine learning pipeline structure and/or an instantiated machine learning pipeline based on a pipeline grammar by utilizing an anytime search approach to train and/or evaluate instantiated machine learning pipeline candidates using a fraction of the data samples in a dataset. For example, machine learning pipeline generation system 102 can generate a machine learning pipeline structure and/or an instantiated machine learning pipeline based on a pipeline grammar by utilizing an anytime search approach to train and/or evaluate instantiated machine learning pipeline candidates without using the entire dataset to perform such training and/or evaluation, thereby reducing computational costs associated with identifying one or more machine learning modules that achieve a defined objective and that can be used to instantiate a machine learning pipeline.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or machine learning pipeline generation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to machine learning pipeline generation system 102, pipeline structure generator component 108, pipeline optimizer component 110, and/or another component associated with machine learning pipeline generation system 102 (e.g., ranker component 202, etc.) as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Machine learning pipeline generation system 102, memory 104, processor 106, pipeline structure generator component 108, pipeline optimizer component 110, and/or another component of machine learning pipeline generation system 102 as described herein (e.g., ranker component 202, etc.) can be communicatively, electrically, operatively, and/or optically coupled to one another via a bus 112 to perform functions of system 100, machine learning pipeline generation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Machine learning pipeline generation system 102 can comprise any type of component, machine, device, facility, apparatus, and/or instrument that comprises a processor and/or can be capable of effective and/or operative communication with a wired and/or wireless network. All such embodiments are envisioned. For example, machine learning pipeline generation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Machine learning pipeline generation system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, machine learning pipeline generation system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, machine learning pipeline generation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, machine learning pipeline generation system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between machine learning pipeline generation system 102 and external systems, sources, and/or devices (e.g., computing devices, communication devices, etc.).

Machine learning pipeline generation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with machine learning pipeline generation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, pipeline structure generator component 108, pipeline optimizer component 110, and/or any other components associated with machine learning pipeline generation system 102 as disclosed herein (e.g., communicatively, electronically, operatively, and/or optically coupled with and/or employed by machine learning pipeline generation system 102), can comprise such computer and/or machine readable, writable, and/or executable component(s) and/or instruction(s). Consequently, according to numerous embodiments, machine learning pipeline generation system 102 and/or any components associated therewith as disclosed herein, can employ processor 106 to execute such computer and/or machine readable, writable, and/or executable component(s) and/or instruction(s) to facilitate performance of one or more operations described herein with reference to machine learning pipeline generation system 102 and/or any such components associated therewith.

Machine learning pipeline generation system 102 can facilitate (e.g., via processor 106) performance of operations executed by and/or associated with pipeline structure generator component 108, pipeline optimizer component 110, and/or another component associated with machine learning pipeline generation system 102 as disclosed herein (e.g., ranker component 202, etc.). For example, as described in detail below, machine learning pipeline generation system 102 can facilitate via processor 106 (e.g., a classical processor, a quantum processor, etc.): generating a machine learning pipeline structure based on a pipeline grammar; and/or selecting one or more machine learning modules that achieve a defined objective to instantiate a machine learning pipeline based on the machine learning pipeline structure.

In the above example, as described in detail below, machine learning pipeline generation system 102 can further facilitate via processor 106 (e.g., a classical processor, a quantum processor, etc.): evaluating one or more machine learning pipeline structure candidates in a pipeline space defined by the pipeline grammar to generate the machine learning pipeline structure based on the pipeline grammar; performing a limited discrepancy search to select the one or more machine learning modules; performing a first limited discrepancy search based on a first search parameter value and one or more second limited discrepancy searches based on one or more second search parameter values to select the one or more machine learning modules; performing at least one of incremental training or incremental evaluation of an instantiated machine learning pipeline candidate using defined quantities of data samples in a dataset to select the one or more machine learning modules; and/or tuning one or more hyperparameters of one or more machine learning module candidates to select the one or more machine learning modules. In the examples above, the machine learning pipeline structure can comprise a directed acyclic graph (DAG) structured machine learning pipeline structure.

Pipeline structure generator component 108 can generate a machine learning pipeline structure based on a pipeline grammar. For example, pipeline structure generator component 108 can generate a machine learning pipeline structure comprising a directed acyclic graph (DAG) structured machine learning pipeline structure based on a pipeline grammar such as, for instance, a pipeline structure grammar. As referenced herein, pipeline grammar and/or pipeline structure grammar can comprise rules based on context-free grammar (CFG) that define how different segments of a pipeline (e.g., a machine learning pipeline) can be combined (e.g., in series, in parallel, etc.) to execute the various operations of each of such segments.

To facilitate generation of a machine learning pipeline structure based on a pipeline grammar, pipeline structure generator component 108 can employ a model that can: search a pipeline space defined by the pipeline grammar; evaluate one or more machine learning pipeline structure candidates in the pipeline space; and/or identify one or more machine learning pipeline structure candidates that satisfy one or more defined criteria and/or that, if instantiated, can achieve a defined objective. For example, pipeline structure generator component 108 can employ a model that can: search a pipeline space defined by the pipeline grammar; evaluate one or more machine learning pipeline structure candidates in the pipeline space; and/or identify one or more of the best and/or most promising machine learning pipeline structure candidates that satisfy one or more defined criteria and/or that, if instantiated, can achieve a defined objective (e.g., can achieve a defined prediction accuracy, can be implemented with a certain type of data (e.g., text, images, audio, video, etc.)). In this example, such best and/or most promising machine learning pipeline structure candidate(s) can comprise the best and/or most promising machine learning pipeline structure candidate(s) relative to all other machine learning pipeline structure candidates in the pipeline space. In this example, pipeline structure generator component 108 can further select one or more of such best and/or most promising machine learning pipeline structure candidates to facilitate generation of one or more machine learning pipeline structures based on the pipeline grammar.

In an example, pipeline structure generator component 108 can employ a best-first search model that can comprise a best-first search algorithm such as, for instance, an A* algorithm and/or a greedy best-first search algorithm that can: search a pipeline space defined by a pipeline grammar; evaluate one or more machine learning pipeline structure candidates in the pipeline space; and/or identify the best and/or most promising machine learning pipeline structure candidate. For instance, in one example embodiment, pipeline structure generator component 108 can employ the greedy best-first search algorithm defined below to: search a pipeline space defined by a pipeline structure grammar G; evaluate one or more machine learning pipeline structure candidates in the pipeline space; and/or identify the best and/or most promising machine learning pipeline structure candidate relative to all other machine learning pipeline structure candidates in the pipeline space. In this example embodiment, pipeline structure generator component 108 can further select such a best and/or most promising machine learning pipeline structure candidate to facilitate generation of a machine learning pipeline structure based on the pipeline structure grammar G.

In one example embodiment, machine learning pipeline generation system 102 can comprise an interface component (e.g., interface component 302 described below with reference to FIG. 3) that can enable machine learning pipeline generation system 102 and/or pipeline structure generator component 108 to receive input comprising, for instance, a pipeline structure grammar G (also referred to herein as a pipeline grammar), a heuristic function (e.g., a surrogate heuristic, a surrogate constraint heuristic, etc.), and/or a max length of pipeline T. In this example embodiment, an entity implementing machine learning pipeline generation system 102 (e.g., an entity such as, for instance, a human, a client, a user, a computing device, a software application, an agent, a machine learning (ML) model, an artificial intelligence (AI) model, etc.) can use such an interface component of machine learning pipeline generation system 102 to define the max length of the pipeline T. In this example embodiment, based on receiving such input defined above, pipeline structure generator component 108 can employ the greedy best-first search algorithm defined below to generate as output the best and/or most promising machine learning pipeline structure candidate relative to all other machine learning pipeline structure candidates in a pipeline space defined by the pipeline structure grammar G, where such a best and/or most promising machine learning pipeline structure candidate satisfies a criteria that it has a size of at most T.

Greedy Best-First Search Algorithm
    Let root='m' (start symbol) and OPEN={root}
    While OPEN is not empty:
      Let n=pop(OPEN)
      If length(n.pipeline)==T and all symbols in n.pipeline are terminals the return n.pipeline
      Expand n by generating its successors succ using the grammar G rules
      For each partial pipeline n' in succ (n' is a partial pipeline):
        Compute a heuristic evaluation function f(n')=h(n') using the surrogate function h( )
          h(n) can be implemented using a neural network (NN) that takes as input a flat representation of the partial pipeline represented by n' (e.g., string of symbols) and predicts the accuracy
        Add n' to OPEN and organize OPEN into a priority queue such that the largest f-value is at the top In another example, pipeline structure generator component 108 can employ an m-best search model that can comprise an m-best search algorithm (e.g., an m-A* algorithm) that can: search the pipeline space defined by the pipeline structure grammar G; evaluate one or more machine learning pipeline structure candidates in the pipeline space; and/or identify the m-best and/or m-most promising machine learning pipeline structure candidates (e.g., where m denotes a quantity) in the pipeline space. For instance, in one example embodiment, pipeline structure generator component 108 can extend the above defined greedy best-first search algorithm and/or A* search algorithm to yield an m-best search algorithm (e.g., m-A* search algorithm) that pipeline structure generator component 108 can employ to: search the pipeline space defined by the pipeline structure grammar G; evaluate one or more machine learning pipeline structure candidates in the pipeline space; and/or identify the m-best and/or m-most promising machine learning pipeline structure candidates relative to all other machine learning pipeline structure candidates in the pipeline space. In this example embodiment, pipeline structure generator component 108 can further select one or more of such an m-best and/or m-most promising machine learning pipeline structure candidates to facilitate generation of one or more machine learning pipeline structures based on the pipeline structure grammar G. In another example embodiment, pipeline structure generator component 108 can also introduce an edge cost and transform the procedure into a best-first search, where:

Edge cost=0 if the corresponding pipeline is selected for further evaluation

Edge cost=1, otherwise

Pipeline optimizer component 110 can select one or more machine learning modules that achieve a defined objective to instantiate a machine learning pipeline based on a machine learning pipeline structure. For example, pipeline optimizer component 110 can select one or more machine learning modules that achieve a defined objective to instantiate a machine learning pipeline based on a machine learning pipeline structure that can be generated by pipeline structure generator component 108 as described above (e.g., by employing a greedy best-first search algorithm, an A* search algorithm, an m-best search algorithm (e.g., m-A* search algorithm), etc.).

To facilitate selection of one or more machine learning modules that achieve a defined objective to instantiate a machine learning pipeline based on a machine learning pipeline structure, pipeline optimizer component 110 can employ a model that can: search and/or identify a set of machine learning modules within a machine learning pipeline structure (e.g., machine learning modules comprising machine learning algorithms such as, for instance, pre-processors, transformers, estimators, etc.); instantiate a machine learning pipeline candidate using such one or more machine learning modules; incrementally train and/or evaluate the instantiated machine learning pipeline candidate (e.g., using a defined quantity of data samples from a dataset at each incremental training and/or evaluation step); and/or tune one or more hyperparameters of such one or more machine learning modules to identify one or more of such machine learning modules that achieve a defined objective (e.g., an objective defined by an objective function such as, for instance, a loss function). Based on performing such operations described above to identify one or more of such machine learning modules that achieve a defined objective and tuning hyperparameter(s) of such module(s), pipeline optimizer component 110 can further select one or more of such machine learning modules to instantiate a machine learning pipeline.

In an example, pipeline optimizer component 110 can employ a limited discrepancy search (LDS) model that can comprise a limited discrepancy search (LDS) algorithm that can: search and/or identify a set of machine learning modules (e.g., pre-processors, transformers, estimators, etc.) within a machine learning pipeline structure (e.g., a machine learning pipeline structure that can be generated by pipeline structure generator component 108 as described above); instantiate a machine learning pipeline candidate using such one or more machine learning modules; incrementally train and/or evaluate the instantiated machine learning pipeline candidate (e.g., using a defined quantity of data samples (e.g., 100, 200, 300, etc.) from a dataset at each incremental training and/or evaluation step); and/or tune one or more hyperparameters of such one or more machine learning modules to identify one or more of such machine learning modules that achieve a defined objective (e.g., an objective defined by an objective function). For instance, in one example embodiment, pipeline optimizer component 110 can employ the limited discrepancy search (LDS) algorithm defined below to perform the operations described above that can enable pipeline optimizer component 110 to identify one or more machine learning modules that achieve a defined objective, tune hyperparameter(s) of such module(s), and further select one or more of such machine learning modules to instantiate a machine learning pipeline.

In one example embodiment, as described above, machine learning pipeline generation system 102 can comprise an interface component (e.g., interface component 302 described below with reference to FIG. 3) that can enable machine learning pipeline generation system 102 and/or pipeline optimizer component 110 to receive input comprising, for instance: a dataset (e.g., a training dataset and/or a validation dataset that can be used to incrementally train and/or evaluate an instantiated machine learning pipeline candidate); a machine learning pipeline structure S (e.g., a machine learning pipeline structure S that can be generated by pipeline structure generator component 108 as described above); a set of machine learning modules (e.g., pre-processors, transformers, estimators, etc.); and/or an objective function O. In this example embodiment, an entity implementing machine learning pipeline generation system 102 (e.g., an entity such as, for instance, a human, a client, a user, a computing device, a software application, an agent, a machine learning (ML) model, an artificial intelligence (AI) model, etc.) can use such an interface component of machine learning pipeline generation system 102 to define and/or provide the objective function O and/or to define one or more quantities of data samples in the dataset that pipeline optimizer component 110 can use to incrementally train and/or evaluate a certain instantiated machine learning pipeline candidate comprising one or more certain machine learning modules.

In one example embodiment, based on receiving such input defined above, pipeline optimizer component 110 can employ the limited discrepancy search (LDS) algorithm defined below to generate as output an instantiated machine learning pipeline, where such an instantiated machine learning pipeline can comprise an optimized machine learning pipeline that achieves the defined objective of the objective function O. In this example embodiment, the limited discrepancy search (LDS) algorithm defined below can comprise an anytime search approach that pipeline optimizer component 110 can employ to incrementally train and/or evaluate instantiated machine learning pipeline candidates using a fraction of the data samples in a dataset. In this example embodiment, such an anytime search approach can be an iterative process that can comprise obtaining an initial solution that might not be of high quality (e.g., an initial instantiated machine learning pipeline candidate comprising one or more machine learning modules that satisfy the objective function O), but the quality can be improved over time (e.g., by discovering and/or identifying another instantiated machine learning pipeline candidate comprising one or more machine learning modules that better satisfy the objective function O). In this example embodiment, pipeline optimizer component 110 can stop the search anytime it obtains an initial solution and/or a subsequent, improved solution as described above.

In one example embodiment, pipeline optimizer component 110 can employ the limited discrepancy search (LDS) algorithm defined below to identify one or more machine learning modules within a machine learning pipeline structure that satisfy the objective function O. In another example embodiment, pipeline optimizer component 110 can employ the limited discrepancy search (LDS) algorithm defined below to perform a first limited discrepancy search (LDS) based on a first search parameter value (e.g., the discrepancy value d defined below that can be set to d=1) and one or more second limited discrepancy searches (LDS) based on one or more second search parameter values (e.g., d=2, d=3, d=4, etc.) to identify such one or more machine learning modules that satisfy the objective function O. In another example embodiment, pipeline optimizer component 110 can employ the limited discrepancy search (LDS) algorithm defined below to perform incremental training and/or incremental evaluation of an instantiated machine learning pipeline candidate using defined quantities (e.g., 100, 200, 300, etc.) of data samples in the dataset to identify such one or more machine learning modules that satisfy the objective function O. In another example embodiment, pipeline optimizer component 110 can employ the limited discrepancy search (LDS) algorithm defined below to tune one or more hyperparameters of one or more machine learning module candidates to identify such one or more machine learning modules that satisfy the objective function O. In the example embodiments above, pipeline optimizer component 110 can further select one or more of such machine learning modules that satisfy the objective function O to generate as output an instantiated machine learning pipeline that satisfies the objective function O (e.g., an optimized machine learning pipeline that achieves the defined objective of the objective function O).

LDS Algorithm (Combined with Alternating Direction Method of Multipliers (ADMM))
  Overview
    Create initial seedling solution by selecting heuristically (or randomly) the modules of the pipeline S
    Repeat the following steps until desired performance according to the objective function O is obtained
      Conduct an LDS search (limited discrepancy search) with discrepancy d=1,2,3, ... n (where n denotes a total quantity)
        At each step in LDS, train and/or evaluate the current pipeline using a fragment of the dataset
          The fragment is determined based on the fragment size previously used and whether or not the current solution was encountered before during the search
      Optimize the hyperparameters of the best instantiated pipeline yielded by LDS search, using standard hyperparameter optimization techniques (e.g., Bayesian optimization)
      Keep track of the best pipeline according to the objective function O As described above, in one example embodiment, pipeline optimizer component 110 can perform a first limited discrepancy search (LDS) based on a first search parameter value (e.g., the discrepancy value d defined below that can be set to d=1) and one or more second limited discrepancy searches (LDS) based on one or more second search parameter values (e.g., d=2, d=3, d=4, etc.) to identify such one or more machine learning modules that satisfy the objective function O. In one example embodiment, pipeline optimizer component 110 can extend the limited discrepancy search (LDS) algorithm as defined below to instantiate one or more machine learning module candidates of a machine learning pipeline structure, where pipeline optimizer component 110 can identify such one or more machine learning modules that satisfy the objective function O by performing such a first limited discrepancy search (LDS) based on a first search parameter value (e.g., the discrepancy value d defined below that can be set to d=1) and one or more second limited discrepancy searches (LDS) based on one or more second search parameter values (e.g., d=2, d=3, d=4, etc.) as described below.

LDS Algorithm—Pipeline Module Instantiation
  Find an initial pipeline instantiation $P_{init}$ in some way (e.g., via random sampling)
  Hypothesis that a better pipeline instantiation exists nearby the initial instantiation
    Discrepancy d=the number of modules to modify their values
  Increase d=1, 2, 3, until: finding a better instantiation, proving no better instantiation exists, and/or using up allocated time
  If a better instantiation $P_{better}$ is found,
    Stop current LDS
    Restart LDS with d=1 and $P_{init}=P_{better}$ As the limited discrepancy search (LDS) algorithm involves large overhead costs (e.g., computational costs) to evaluate each instantiated machine learning pipeline candidate, in some embodiments, pipeline optimizer component 110 can control the size of training data based on the promise (e.g., the potential) of each instantiated machine learning pipeline candidate. For instance, in one example embodiment, pipeline optimizer component 110 can extend the limited discrepancy search (LDS) algorithm as defined below to control (e.g., limit) the quantity of data samples in a dataset that can be used to train and/or evaluate each instantiated machine learning pipeline candidate based on the promise (e.g., the potential) of each instantiated machine learning pipeline candidate.

LDS Algorithm—Controlling the Training Data Size
  Allocate $cr^i$ training examples
    c and r: constants
    i=0 when an instantiated pipeline is evaluated for the first time
  At the start of LDS search with discrepancy d=1, evaluate the initial instantiation with $cr^{j+1}$ training examples
  During LDS search with discrepancy d, determine if an instantiated pipeline P should be evaluated:
    Skip evaluating instantiated pipelines whose discrepancies are <d
    Evaluate with $cr^{j+1}$ training examples if j+d<i holds
      $cr^j$ is the size of training data with which P was evaluated last time
    Otherwise, reuse the objective value of P and compare against that of the initial instantiation In some embodiments, pipeline optimizer component 110 can further control the size of training data used to train and/or evaluate instantiated machine learning pipeline candidates by combining the limited discrepancy search (LDS) algorithm with a multi-armed bandit problem approach. For example, in one example embodiment, pipeline optimizer component 110 can combine the limited discrepancy search (LDS) algorithm with a multi-arm bandit problem approach as defined below to determine, at each training and/or evaluation iteration, which of multiple instantiated machine learning pipeline candidates will be allocated the subsets of data samples (e.g., the defined quantities of data samples in a dataset that can be used to train and/or evaluate each instantiated machine learning pipeline candidate as described above). In this example embodiment, based on input comprising one or more datasets (e.g., training datasets, evaluation datasets, etc.) and one or more instantiated machine learning pipeline candidates, pipeline optimizer component 110 can combine the limited discrepancy search (LDS) algorithm with a multi-arm bandit problem approach as defined below to select an instantiated machine learning pipeline candidate that will give near-optimal accuracy when trained on all data, while also minimizing the cost of misallocated samples. In this example embodiment, pipeline optimizer component 110 can combine the limited discrepancy search (LDS) algorithm with a multi-arm bandit problem approach as defined below based on the principle of "optimism under uncertainty" to compute an upper bound based on the size of the training dataset allocated, the size of the overall trained datasets, and the accuracy on the training dataset.

LDS Algorithm+Multi-Armed Bandit Problem
    Criterion for comparing the estimated performance of two instantiated pipelines:
        In one embodiment, directly compare objective values of the pipelines (e.g., ignore the difference of training data size between two pipelines)
        In another embodiment, introduce values based on a formula such as, for instance, an upper confidence bounds (UCB) algorithm (e.g., a UCB1 algorithm:
        UCB=exploitation_term+exploration_term
        exploitation_term—accounting for objective value
        Exploratation_term—accounting for the training data size used and the number of times LDS visits that pipeline
    An approach to further reduce search space can be introduced
        For example, check Lower Confidence Value (e.g., Exploitation_term—exploration_term) of a pipeline is already better than UCB of the other pipeline In some embodiments, pipeline optimizer component 110 can implement a scheme to control the size of training data used to train and/or evaluate instantiated machine learning pipeline candidates based on the type of data (e.g., text, images, audio, video, etc.). In these embodiments, an entity implementing machine learning pipeline generation system 102 (e.g., an entity such as, for instance, a human, a client, a user, a computing device, a software application, an agent, a machine learning (ML) model, an artificial intelligence (AI) model, etc.) can define and/or specify the type(s) of data via an interface component as described above (e.g., interface component 302 described below with reference to FIG. 3). In one example embodiment, the instantiated machine learning pipeline candidates can comprise one or more machine learning module candidates that can perform classification and/or regression tasks. In this example embodiment, the order of the training data (e.g., the defined quantity of data samples that can be used by pipeline optimizer component 110 to train and/or evaluate each instantiated machine learning pipeline candidate) can be changed when a subset of the training data is generated. In another example embodiment, the instantiated machine learning pipeline candidates can comprise one or more machine learning module candidates that can perform prediction tasks using time-series data. In this example embodiment, the order of each data point can be preserved in a subset of the training data (e.g., the defined quantity of data samples that can be used by pipeline optimizer component 110 to train and/or evaluate each instantiated machine learning pipeline candidate).

Figure 2:
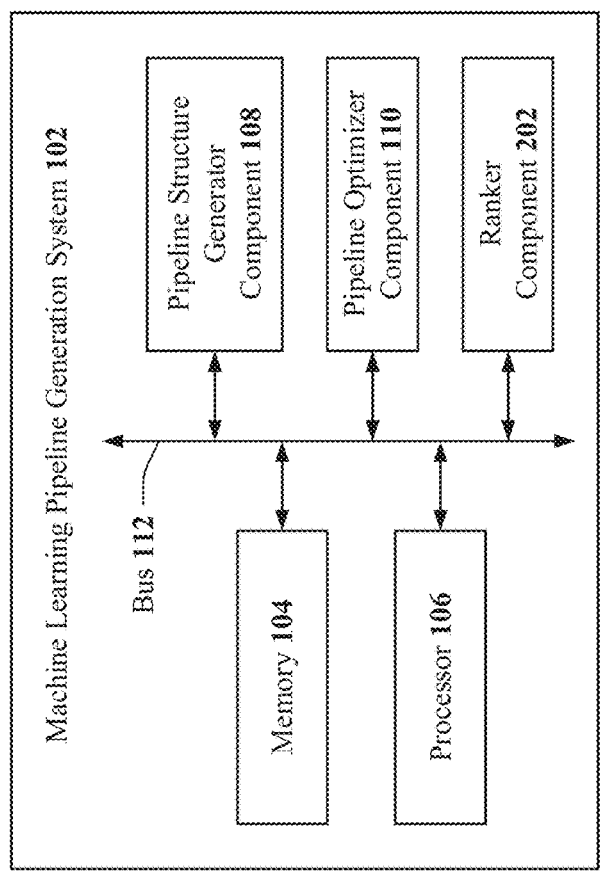
FIG. 2 illustrates a block diagram of an example, non-limiting system that can facilitate automated generation of a machine learning pipeline based on a pipeline grammar in accordance with one or more embodiments described herein.

FIG. 2 illustrates a block diagram of an example, non-limiting system 200 that can facilitate automated generation of a machine learning pipeline based on a pipeline grammar in accordance with one or more embodiments described herein. System 200 can comprise machine learning pipeline generation system 102, which can further comprise a ranker component 202. Repetitive description of like elements and/or processes employed in respective embodiments is omitted for sake of brevity.

Ranker component 202 can rank machine learning pipeline structure candidates and/or instantiated machine learning pipeline candidates based on a defined objective. For example, ranker component 202 can comprise a priority queue that can rank the machine learning pipeline structure candidates and/or the instantiated machine learning pipeline candidates that can be evaluated by pipeline structure generator component 108 and/or pipeline optimizer component 110, respectively, based on a defined objective. For instance, ranker component 202 can comprise a priority queue that can rank such machine learning pipeline structure candidates and/or instantiated machine learning pipeline candidates based on a defined objective such as, for example, an objective function (e.g., a loss function) and/or f-values.

In an example, ranker component 202 can comprise a priority queue that can rank machine learning pipeline structure candidates evaluated by pipeline structure generator component 108 in descending order such that candidates having larger f-values (e.g., relative to all other candidates) can be listed at the top of such a priority queue and candidates having smaller f-values (e.g., relative to all other candidates) can be listed at the bottom of such a priority queue. In another example, ranker component 202 can comprise a priority queue that can rank instantiated machine learning pipeline candidates evaluated by pipeline optimizer component 110 based on the objective function O (e.g., a loss function) described above with reference to FIG. 1.

Figure 3:
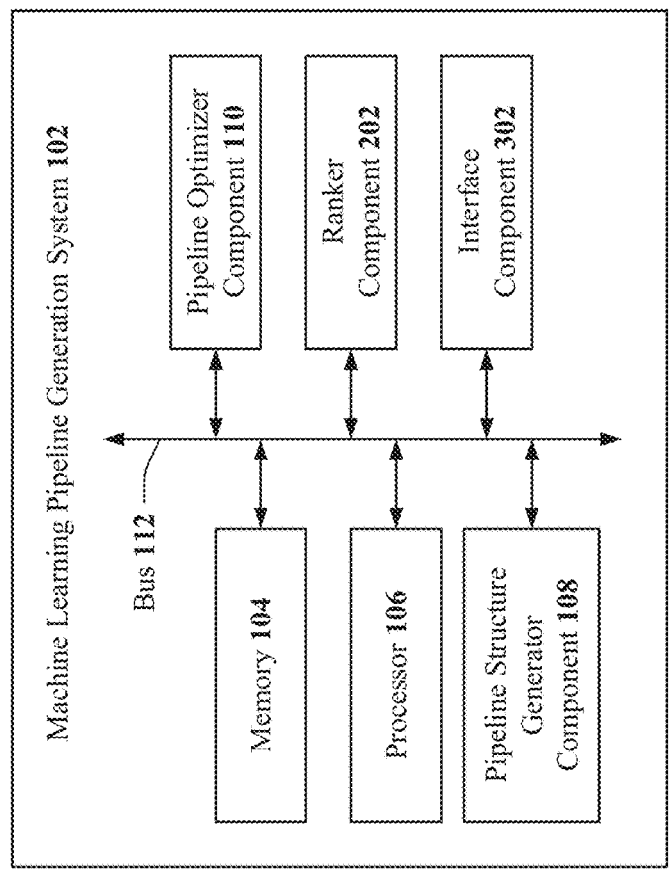
FIG. 3 illustrates a block diagram of an example, non-limiting system that can facilitate automated generation of a machine learning pipeline based on a pipeline grammar in accordance with one or more embodiments described herein.

FIG. 3 illustrates a block diagram of an example, non-limiting system 300 that can facilitate automated generation of a machine learning pipeline based on a pipeline grammar in accordance with one or more embodiments described herein. System 300 can comprise machine learning pipeline generation system 102, which can further comprise an interface component 302. Repetitive description of like elements and/or processes employed in respective embodiments is omitted for sake of brevity.

Interface component 302 can comprise an interface component including, but not limited to, an application programming interface (API), a representational state transfer API, a graphical user interface (GUI), and/or another interface component. Interface component 302 can enable an entity (e.g., a human, a client, a user, a computing device, a software application, an agent, a machine learning (ML) model, an artificial intelligence (AI) model, etc.) to provide machine learning pipeline generation system 102 and/or one or more components thereof (e.g., pipeline structure generator component 108, pipeline optimizer component 110, etc.) with one or more of the inputs and/or definitions described above with reference to FIG. 1 (e.g., the pipeline structure grammar G, a heuristic function, the max length of pipeline T, a dataset, a machine learning pipeline structure S, a set of machine learning modules, the objective function O, etc.). Interface component 302 can further enable machine learning pipeline generation system 102 and/or one or more components thereof (e.g., pipeline structure generator component 108, pipeline optimizer component 110, etc.) to provide such an entity with one or more of the outputs described above with reference to FIG. 1 (e.g., the best and/or m-best machine learning pipeline structures output by pipeline structure generator component 108, the instantiated machine learning pipeline output by pipeline optimizer component 110, etc.).

Figure 4:
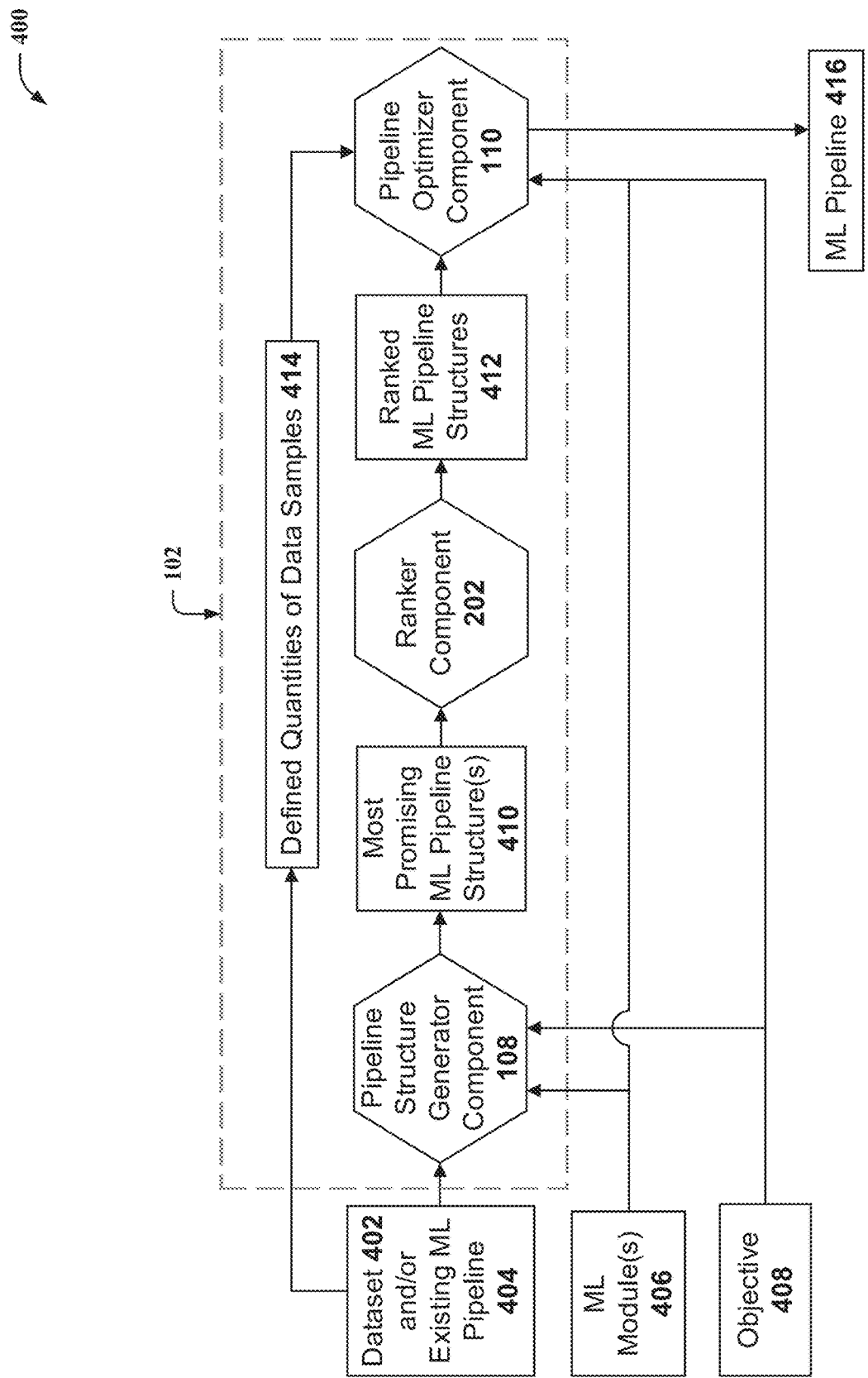
FIG. 4 illustrates a diagram of an example, non-limiting system that can facilitate automated generation of a machine learning pipeline based on a pipeline grammar in accordance with one or more embodiments described herein.

FIG. 4 illustrates a diagram of an example, non-limiting system 400 that can facilitate automated generation of a machine learning pipeline based on a pipeline grammar in accordance with one or more embodiments described herein. System 400 can comprise machine learning pipeline generation system 102. Repetitive description of like elements and/or processes employed in respective embodiments is omitted for sake of brevity.

As illustrated in FIG. 4, machine learning pipeline generation system 102 and/or one or more components thereof (e.g., pipeline structure generator component 108, pipeline optimizer component 110, etc.) can receive (e.g., via interface component 302) one or more inputs comprising, for example: a dataset 402 (e.g., a dataset that can be used by pipeline optimizer component 110 to train and/or evaluate an instantiated machine learning pipeline candidate); an existing machine learning (ML) pipeline 404 such as, for instance, an instantiated machine learning pipeline; one or more machine learning (ML) modules 406 including, but not limited to, a support vector machine (SVM), a decision tree (DT), a multilayer perceptron (MLP), and/or another machine learning module; and/or an objective 408 comprising, for instance, an objective function, a loss function, and/or a defined prediction accuracy. Although not illustrated in FIG. 4, in some embodiments, machine learning pipeline generation system 102 and/or one or more components thereof (e.g., pipeline structure generator component 108, pipeline optimizer component 110, etc.) can also receive (e.g., via interface component 302) input comprising a pipeline grammar (e.g., pipeline structure grammar G).

In some embodiments, machine learning pipeline generation system 102 and/or one or more components thereof (e.g., pipeline structure generator component 108, pipeline optimizer component 110, etc.) do not receive an existing machine learning (ML) pipeline 404 (e.g., an instantiated machine learning pipeline), as such input is optional. In these embodiments, where machine learning pipeline generation system 102 and/or one or more components thereof (e.g., pipeline structure generator component 108, pipeline optimizer component 110, etc.) do not receive such an existing machine learning (ML) pipeline 404, machine learning pipeline generation system 102 (e.g., via pipeline structure generator component 108, pipeline optimizer component 110, ranker component 202, etc.) can still perform the various operations of one or more embodiments of the subject disclosure as described herein using dataset 402, machine learning (ML) module(s) 406, objective 408, and/or a pipeline grammar (not illustrated in FIG. 4).

In one example embodiment, pipeline structure generator component 108 can employ the greedy best-first search algorithm (e.g., A* search algorithm) and/or the m-best search algorithm (e.g., m-A* search algorithm) defined above with reference to FIG. 1 to generate the best and/or the m-best most promising machine learning pipeline structure candidate(s) relative to all other machine learning pipeline structure candidates in a pipeline space defined by a pipeline grammar (e.g., pipeline structure grammar G). For example, pipeline structure generator component 108 can employ the greedy best-first search algorithm (e.g., A* search algorithm) and/or the m-best search algorithm (e.g., m-A* search algorithm) defined above with reference to FIG. 1 to generate one or more most promising machine learning (ML) pipeline structures 410 illustrated in FIG. 4. In this example, such one or more most promising machine learning (ML) pipeline structures 410 can comprise the best and/or the m-best most promising machine learning pipeline structure candidate(s) relative to all other machine learning pipeline structure candidates in a pipeline space defined by a pipeline grammar (e.g., pipeline structure grammar G).

In an example, as described above with reference to FIG. 2, ranker component 202 can rank machine learning pipeline structure candidates evaluated by and/or generated by pipeline structure generator component 108. For instance, based on receiving one or more most promising machine learning (ML) pipeline structures 410 from pipeline structure generator component 108 as illustrated in FIG. 4, ranker component 202 can rank such most promising machine learning (ML) pipeline structure(s) 410 to yield ranked machine learning (ML) pipeline structures 412. In this example, ranker component 202 can rank such most promising machine learning (ML) pipeline structure(s) 410 in a priority queue based on f-values corresponding to such structure candidate(s) to yield ranked machine learning (ML) pipeline structures 412.

In one example embodiment, based on receiving ranked machine learning (ML) pipeline structures 412 from ranker component 202 as illustrated in FIG. 4, pipeline optimizer component 110 can: employ the limited discrepancy search (LDS) algorithm defined above with reference to FIG. 1 to select one or more machine learning module candidates from machine learning (ML) modules 406 (e.g., SVM, DT, MLP, etc.); incrementally train and/or evaluate one or more instantiated machine learning pipeline candidates (e.g., most promising machine learning (ML) structure(s) 410 and/or ranked machine learning (ML) pipeline structures 412) comprising such one or more machine learning module candidates using defined quantities of data samples 414 from dataset 402; and/or tune one or more hyperparameters of such one or more machine learning module candidates to output a machine learning (ML) pipeline 416 comprising an instantiated machine learning pipeline that satisfies objective 408 (e.g., an optimized machine learning pipeline that achieves a defined objective of an objective function, a loss function, and/or a defined prediction accuracy).

Figure 5:
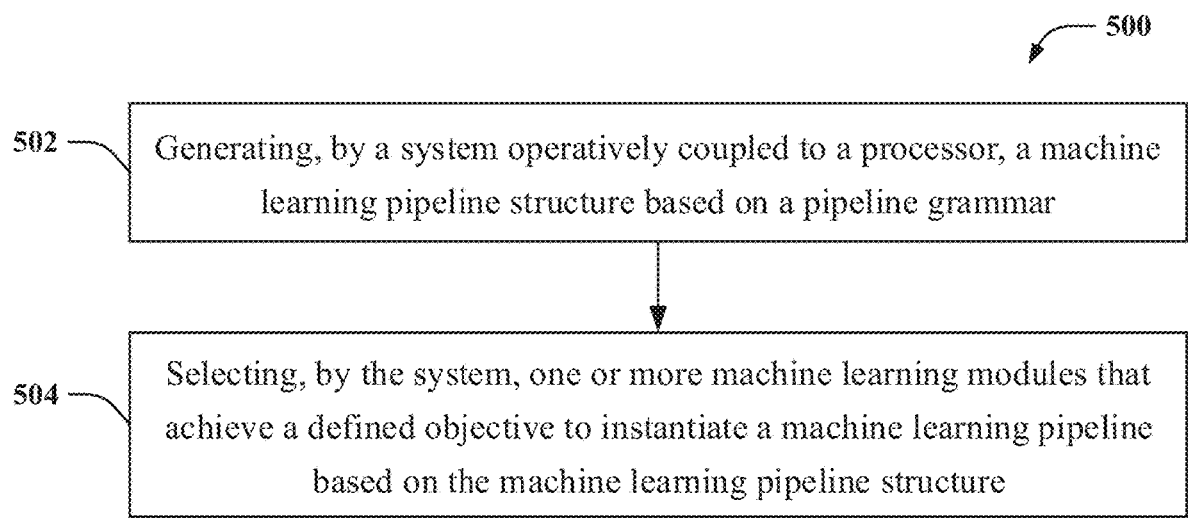
FIG. 5 illustrates a flow diagram of an example, non-limiting computer-implemented method that can facilitate automated generation of a machine learning pipeline based on a pipeline grammar in accordance with one or more embodiments described herein.

FIG. 5 illustrates a flow diagram of an example, non-limiting computer-implemented method 500 that can facilitate automated generation of a machine learning pipeline based on a pipeline grammar in accordance with one or more embodiments described herein. Repetitive description of like elements and/or processes employed in respective embodiments is omitted for sake of brevity.

At 502, computer-implemented method 500 can comprise generating, by a system (e.g., via machine learning pipeline generation system 102 and/or pipeline structure generator component 108) operatively coupled to a processor (e.g., processor 106, a quantum processor, etc.), a machine learning pipeline structure (e.g., a DAG structured machine learning pipeline structure) based on a pipeline grammar (e.g., pipeline structure grammar G described above with reference to FIG. 1).

At 504, computer-implemented method 500 can comprise selecting, by the system (e.g., via machine learning pipeline generation system 102 and/or pipeline optimizer component 110), one or more machine learning modules (e.g., SVM, DT, MLP, etc.) that achieve a defined objective (e.g., an objective function, a loss function, a predictive accuracy, etc.) to instantiate a machine learning pipeline based on the machine learning pipeline structure.

Figure 6:
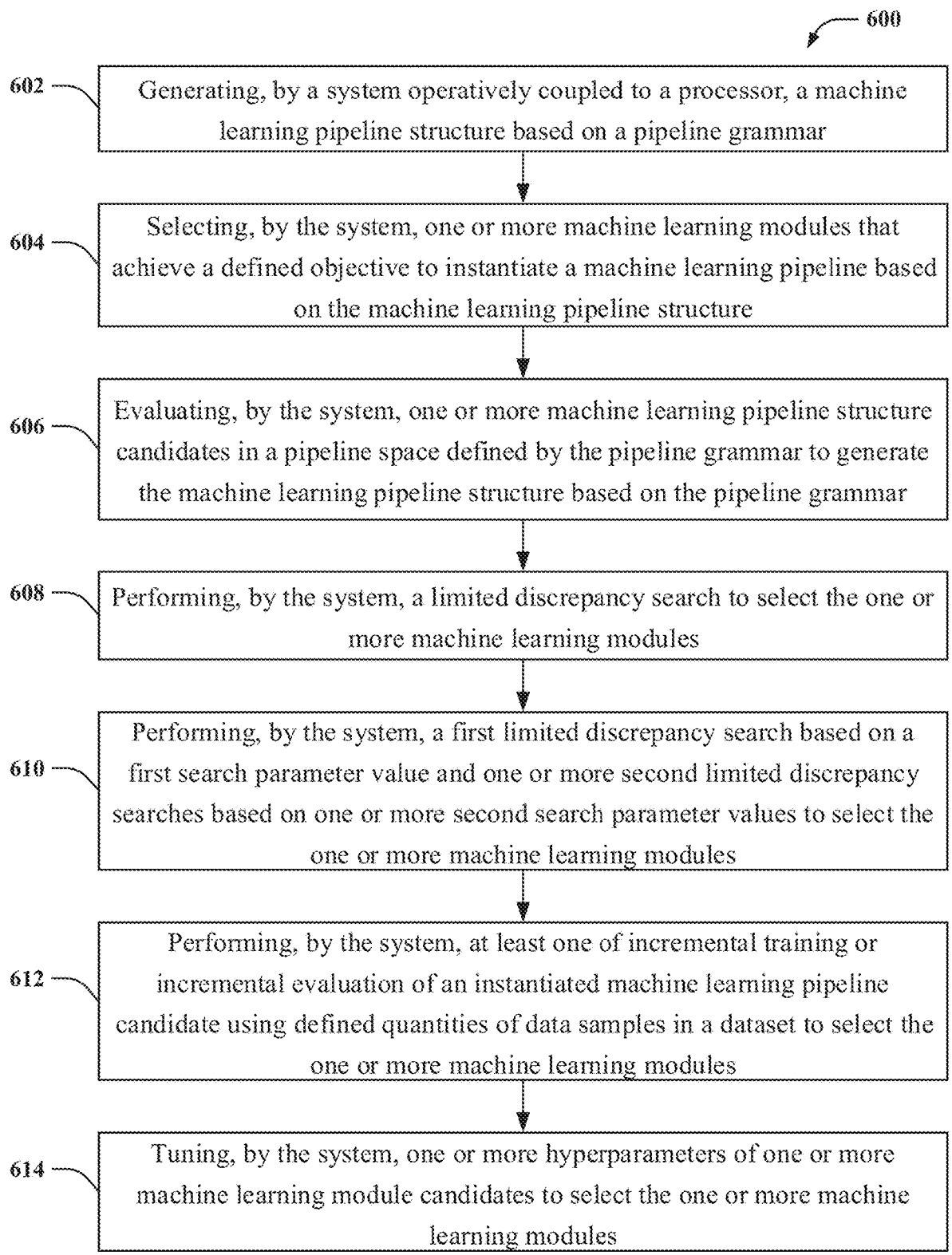
FIG. 6 illustrates a flow diagram of an example, non-limiting computer-implemented method that can facilitate automated generation of a machine learning pipeline based on a pipeline grammar in accordance with one or more embodiments described herein.

FIG. 6 illustrates a flow diagram of an example, non-limiting computer-implemented method 600 that can facilitate automated generation of a machine learning pipeline based on a pipeline grammar in accordance with one or more embodiments described herein. Repetitive description of like elements and/or processes employed in respective embodiments is omitted for sake of brevity.

At 602, computer-implemented method 600 can comprise generating, by a system (e.g., via machine learning pipeline generation system 102 and/or pipeline structure generator component 108) operatively coupled to a processor (e.g., processor 106, a quantum processor, etc.), a machine learning pipeline structure (e.g., a DAG structured machine learning pipeline structure) based on a pipeline grammar (e.g., pipeline structure grammar G described above with reference to FIG. 1).

At 604, computer-implemented method 600 can comprise selecting, by the system (e.g., via machine learning pipeline generation system 102 and/or pipeline optimizer component 110), one or more machine learning modules (e.g., SVM, DT, MLP, etc.) that achieve a defined objective (e.g., an objective function, a loss function, a predictive accuracy, etc.) to instantiate a machine learning pipeline based on the machine learning pipeline structure.

At 606, computer-implemented method 600 can comprise evaluating, by the system (e.g., via machine learning pipeline generation system 102 and/or pipeline structure generator component 108), one or more machine learning pipeline structure candidates in a pipeline space defined by the pipeline grammar to generate the machine learning pipeline structure based on the pipeline grammar.

At 608, computer-implemented method 600 can comprise performing, by the system (e.g., via machine learning pipeline generation system 102 and/or pipeline optimizer component 110), a limited discrepancy search (e.g., the LDS algorithm described above with reference to FIG. 1) to select the one or more machine learning modules.

At 610, computer-implemented method 600 can comprise performing, by the system (e.g., via machine learning pipeline generation system 102 and/or pipeline optimizer component 110), a first limited discrepancy search based on a first search parameter value (e.g., a discrepancy value of d=1 as described above with reference to FIG. 1) and one or more second limited discrepancy searches based on one or more second search parameter values (e.g., discrepancy value(s) of d=2, d=3, d=4, etc.) as described above with reference to FIG. 1) to select the one or more machine learning modules.

At 612, computer-implemented method 600 can comprise performing, by the system (e.g., via machine learning pipeline generation system 102 and/or pipeline optimizer component 110), at least one of incremental training or incremental evaluation of an instantiated machine learning pipeline candidate using defined quantities of data samples (e.g., 100, 200, 300, etc.) in a dataset (e.g., a training dataset, an evaluation dataset, etc.) to select the one or more machine learning modules.

At 614, computer-implemented method 600 can comprise tuning, by the system (e.g., via machine learning pipeline generation system 102 and/or pipeline optimizer component 110), one or more hyperparameters of one or more machine learning module candidates to select the one or more machine learning modules.

Figure 7:
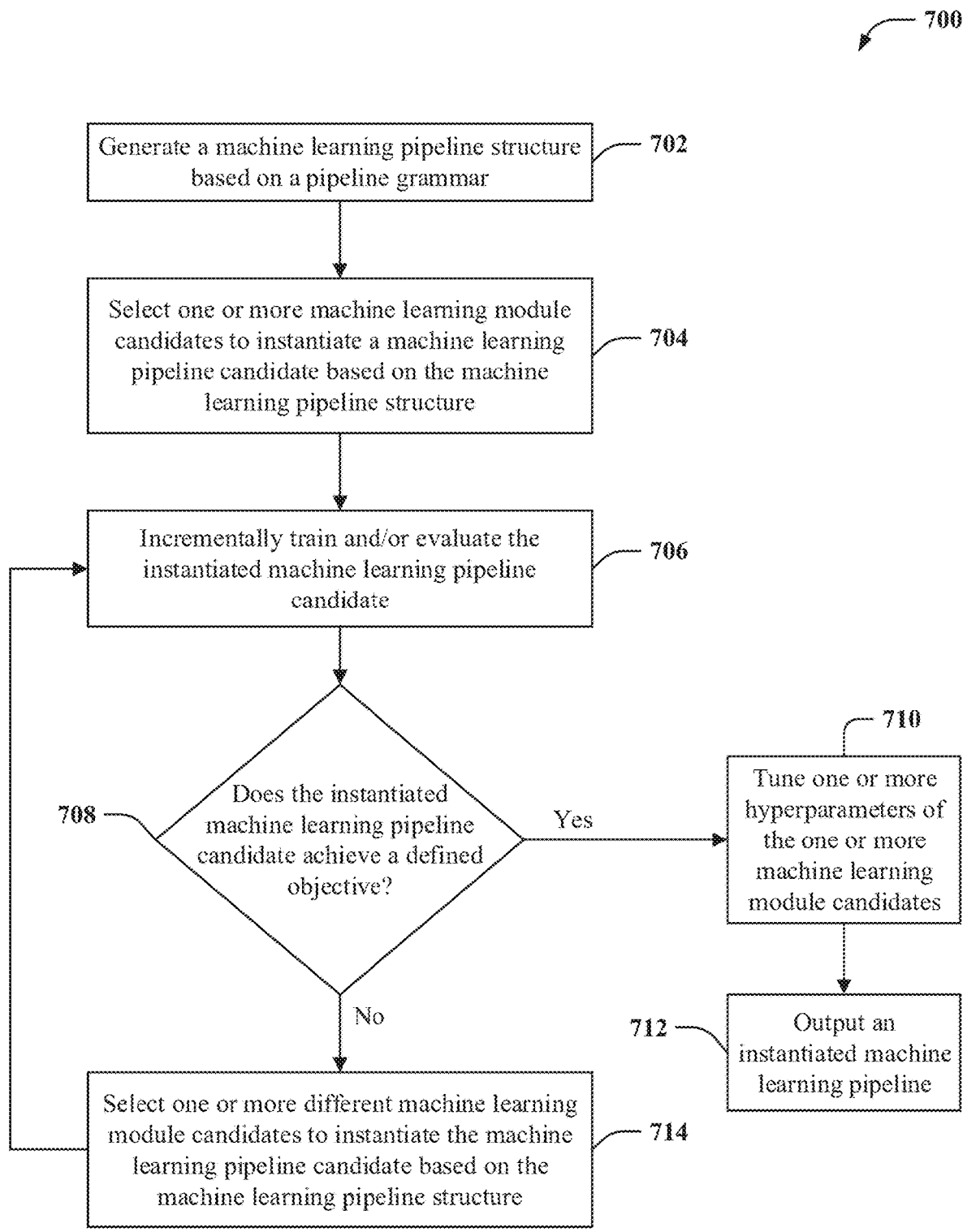
FIG. 7 illustrates a flow diagram of an example, non-limiting computer-implemented method that can facilitate automated generation of a machine learning pipeline based on a pipeline grammar in accordance with one or more embodiments described herein.

FIG. 7 illustrates a flow diagram of an example, non-limiting computer-implemented method 700 that can facilitate automated generation of a machine learning pipeline based on a pipeline grammar in accordance with one or more embodiments described herein. Repetitive description of like elements and/or processes employed in respective embodiments is omitted for sake of brevity.

At 702, computer-implemented method 700 can comprise generating (e.g., via machine learning pipeline generation system 102 and/or pipeline structure generator component 108) a machine learning pipeline structure (e.g., a DAG structured machine learning pipeline structure) based on a pipeline grammar (e.g., pipeline structure grammar G described above with reference to FIG. 1).

At 704, computer-implemented method 700 can comprise selecting (e.g., via machine learning pipeline generation system 102 and/or pipeline optimizer component 110) one or more machine learning module candidates (e.g., SVM, DT, MLP) to instantiate a machine learning pipeline candidate based on the machine learning pipeline structure. For example, pipeline optimizer component 110 can employ the limited discrepancy search (LDS) algorithm defined above with reference to FIG. 1 to identify one or more machine learning modules within a machine learning pipeline structure that satisfy a defined objective such as, for instance, an objective function (e.g., objective function O).

At 706, computer-implemented method 700 can comprise incrementally training and/or evaluating (e.g., via machine learning pipeline generation system 102, pipeline optimizer component 110, and/or ranker component 202) the instantiated machine learning pipeline candidate. For example, pipeline optimizer component 110 can employ the limited discrepancy search (LDS) algorithm defined above with reference to FIG. 1 to incrementally train and/or evaluate instantiated machine learning pipeline candidates using a fraction of the data samples (e.g., 100, 200, 300, etc.) in a dataset (e.g., a training dataset, an evaluation dataset, etc.).

At 708, computer-implemented method 700 can comprise determining (e.g., via machine learning pipeline generation system 102, pipeline optimizer component 110, ranker component 202, and/or an entity as defined herein that implements machine learning pipeline generation system 102) whether the instantiated machine learning pipeline candidate achieves a defined objective such as, for instance, an objective function (e.g., objective function O).

If it is determined at 708 that the instantiated machine learning pipeline candidate comprising the one or more machine learning module candidates selected at 704 does achieve the defined objective (e.g., as defined by an objective function), at 710, computer-implemented method 700 can comprise tuning (e.g., via pipeline optimizer component 110) one or more hyperparameters of the one or more machine learning module candidates selected at 704. Based on such tuning of one or more hyperparameters of the one or more machine learning module candidates, at 712, computer-implemented method 700 can comprise outputting (e.g., via machine learning pipeline generation system 102, pipeline optimizer component 110, and/or interface component 302) an instantiated machine learning pipeline. For example, pipeline optimizer component 110 can employ the limited discrepancy search (LDS) algorithm defined above with reference to FIG. 1 to output an instantiated machine learning pipeline that can comprise an optimized machine learning pipeline that achieves a defined objective such as, for instance, an objective function (e.g., objective function O).

If it is determined at 708 that the instantiated machine learning pipeline candidate comprising the one or more machine learning module candidates selected at 704 does not achieve the defined objective (e.g., as defined by an objective function), at 714, computer-implemented method 700 can comprise selecting (e.g., via machine learning pipeline generation system 102, pipeline optimizer component 110, and/or ranker component 202) one or more different machine learning module candidates (e.g., different from the machine learning module candidate(s) selected at 704) to instantiate the machine learning pipeline candidate based on the machine learning pipeline structure. For example, the limited discrepancy search (LDS) algorithm defined above with reference to FIG. 1 can comprise an anytime search approach that pipeline optimizer component 110 can employ to iteratively identify (e.g., discover) and/or select different machine learning module candidates within a machine learning pipeline structure that can be used to instantiate a machine learning pipeline candidate. In this example, as described above, such an anytime search approach can be an iterative process that can comprise obtaining an initial solution (e.g., an initial instantiated machine learning pipeline candidate comprising one or more initial machine learning module candidates) that does not achieve a defined objective and/or that might not be of high quality, but the quality can be improved over time (e.g., by discovering and/or identifying another instantiated machine learning pipeline candidate comprising one or more different machine learning modules that satisfy and/or better satisfy the objective function). In this example, pipeline optimizer component 110 can further employ such an anytime search approach to incrementally train and/or evaluate, at 706, different instantiated machine learning pipeline candidates comprising different machine learning module candidates using a fraction of the data samples (e.g., 100, 200, 300, etc.) in a dataset (e.g., a training dataset, an evaluation dataset, etc.). In this example, pipeline optimizer component 110 can further employ such an anytime search approach to determine, at 708, whether each of such different instantiated machine learning pipeline candidates achieves a defined objective and/or achieves the defined objective better than previously evaluated instantiated machine learning pipeline candidates.

Pipeline optimizer component 110 can repeat operations 706, 708, and/or 714 of computer-implemented method 700 until at least one of the following scenarios is realized: a) it identifies (e.g., discovers) a better instantiation of a machine learning pipeline candidate relative to all previously evaluated instantiations; b) it proves that no better instantiation exists; c) and/or it uses all time allocated to perform such operations. At such a time that at least one of such scenarios defined above is realized, pipeline optimizer component 110 can proceed to operations 710 and/or 712 of computer-implemented method 700 as described above.

Machine learning pipeline generation system 102 can be associated with various technologies. For example, machine learning pipeline generation system 102 can be associated with machine learning pipeline generation technologies, automated machine learning pipeline generation technologies, data science and/or data analytics technologies, cloud computing technologies, machine learning technologies, artificial intelligence technologies, and/or other technologies.

Machine learning pipeline generation system 102 can provide technical improvements to systems, devices, components, operational steps, and/or processing steps associated with the various technologies identified above. For example, machine learning pipeline generation system 102 can generate a machine learning pipeline structure based on a pipeline grammar; and/or select one or more machine learning modules that achieve a defined objective to instantiate a machine learning pipeline based on the machine learning pipeline structure. In this example, by generating the machine learning pipeline structure based on a pipeline grammar, machine learning pipeline generation system 102 can search a pipeline space defined by the pipeline grammar that is greater that the space searched by existing machine learning pipeline generation technologies to identity (e.g., discover) machine learning pipeline structure candidates, and thus, machine learning pipeline generation system 102 is not limited to certain domain spaces and/or certain data types (e.g., text, images, audio, video, etc.).

Additionally, or alternatively, in another example, machine learning pipeline generation system 102 can employ the limited discrepancy search (LDS) algorithm described above with reference to FIG. 1 to iteratively instantiate and evaluate different machine learning pipeline candidates comprising different machine learning module candidates until it identifies a machine learning pipeline candidate that achieve a defined objective and/or achieves the defined objective better than all other candidates previously evaluated. In this example, machine learning pipeline generation system 102 can incrementally train and/or evaluate each of such instantiated machine learning pipeline candidates using defined quantities of data samples, each constituting a fraction of a dataset. In this example, such incremental use of only a fraction of a dataset to evaluate and/or train the different instantiated machine learning pipeline candidates can reduce the processing workload and/or the computational costs associated with generating a machine learning pipeline.

Machine learning pipeline generation system 102 can provide technical improvements to a processing unit (e.g., processor 106) associated with a classical computing device and/or a quantum computing device (e.g., a quantum processor, quantum hardware, superconducting circuit, etc.) associated with machine learning pipeline generation system 102. For example, by using of only a fraction of a dataset to evaluate and/or train the different instantiated machine learning pipeline candidates as described above, machine learning pipeline generation system 102 can reduce the processing workload and/or computational costs associated with generating a machine learning pipeline. In this example, by reducing such a processing workload, machine learning pipeline generation system 102 can thereby reduce the processing cycles of a processing unit (e.g., processor 106) employed to generate such a machine learning pipeline, which can facilitate improved performance, improved efficiency, and/or reduced computational costs of such a processing unit (e.g., processor 106).

Based on such improved machine learning pipeline generation operations described above, a practical application of machine learning pipeline generation system 102 is that it can be implemented by an automated artificial intelligence entity (e.g., an automated machine learning pipeline generation entity) to facilitate improved generation of a machine learning pipeline based on a pipeline grammar, where such a machine learning pipeline satisfies a defined objective (e.g., an objective function, a loss function, a predictive accuracy, etc.) and/or satisfies the defined objective better than all other machine learning pipeline candidates evaluated.

It should be appreciated that machine learning pipeline generation system 102 provides a new approach driven by relatively new automated artificial intelligence technologies (e.g., an automated machine learning pipeline generation entity). For example, machine learning pipeline generation system 102 provides a new approach to: discover machine learning pipeline structure candidates in a more expansive pipeline search space defined by a pipeline grammar; evaluate various machine learning module candidates within the machine learning pipeline structure candidates; and/or select a machine learning pipeline that satisfies a defined objective (e.g., an objective function, a loss function, a predictive accuracy, etc.).

Machine learning pipeline generation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Machine learning pipeline generation system 102 and/or components thereof, can be employed to solve new problems that arise through advancements in technologies mentioned above, employment of quantum computing systems, cloud computing systems, computer architecture, and/or another technology.

It is to be appreciated that machine learning pipeline generation system 102 can utilize various combinations of electrical components, mechanical components, and circuitry that cannot be replicated in the mind of a human or performed by a human, as the various operations that can be executed by machine learning pipeline generation system 102 and/or components thereof as described herein are operations that are greater than the capability of a human mind. For instance, the amount of data processed, the speed of processing such data, or the types of data processed by machine learning pipeline generation system 102 over a certain period of time can be greater, faster, or different than the amount, speed, or data type that can be processed by a human mind over the same period of time.

According to several embodiments, machine learning pipeline generation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that machine learning pipeline generation system 102 can include information that is impossible to obtain manually by an entity, such as a human user. For example, the type, amount, and/or variety of information included in machine learning pipeline generation system 102, pipeline structure generator component 108, pipeline optimizer component 110, ranker component 202, interface component 302, and/or system 400 can be more complex than information obtained manually by a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
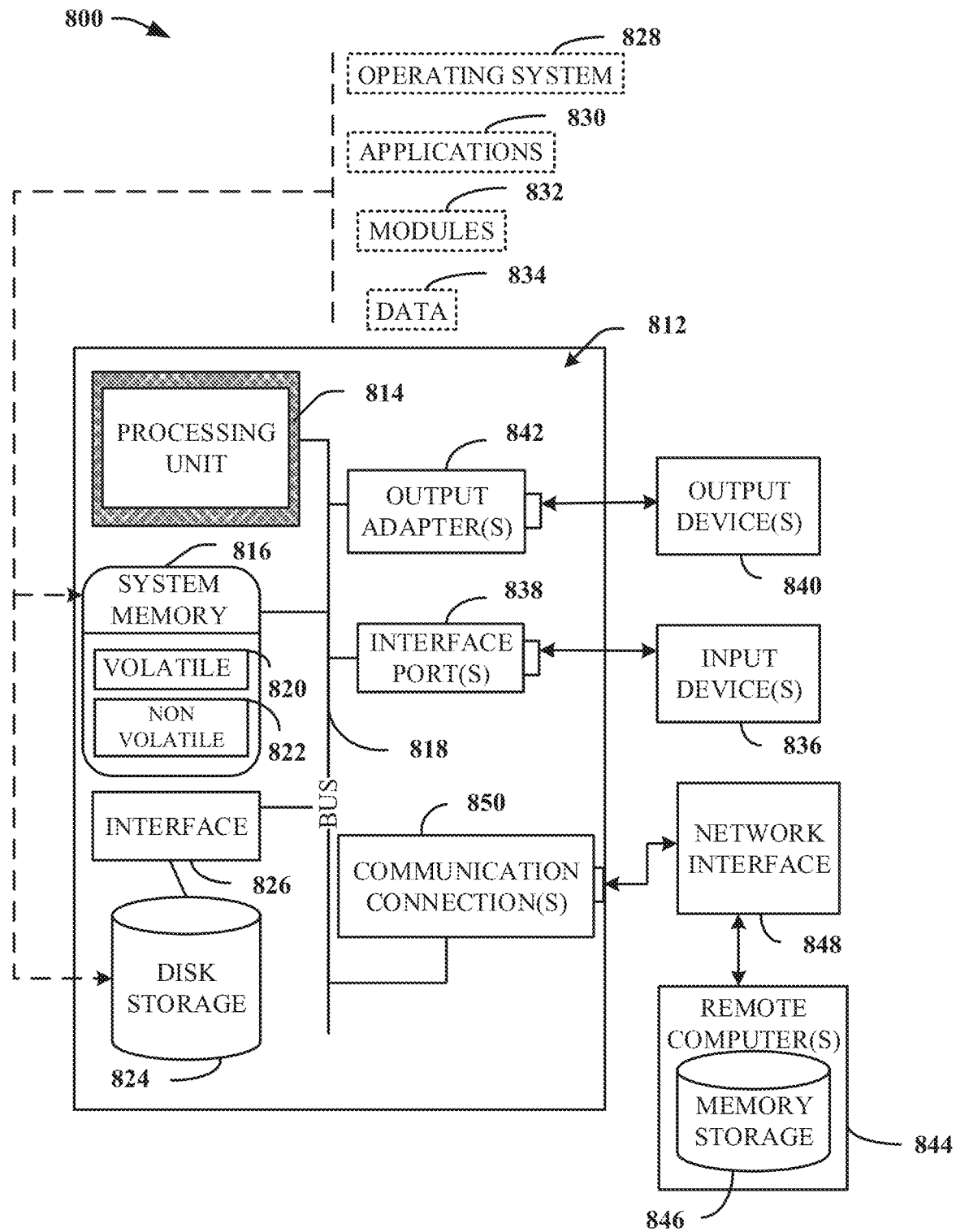
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
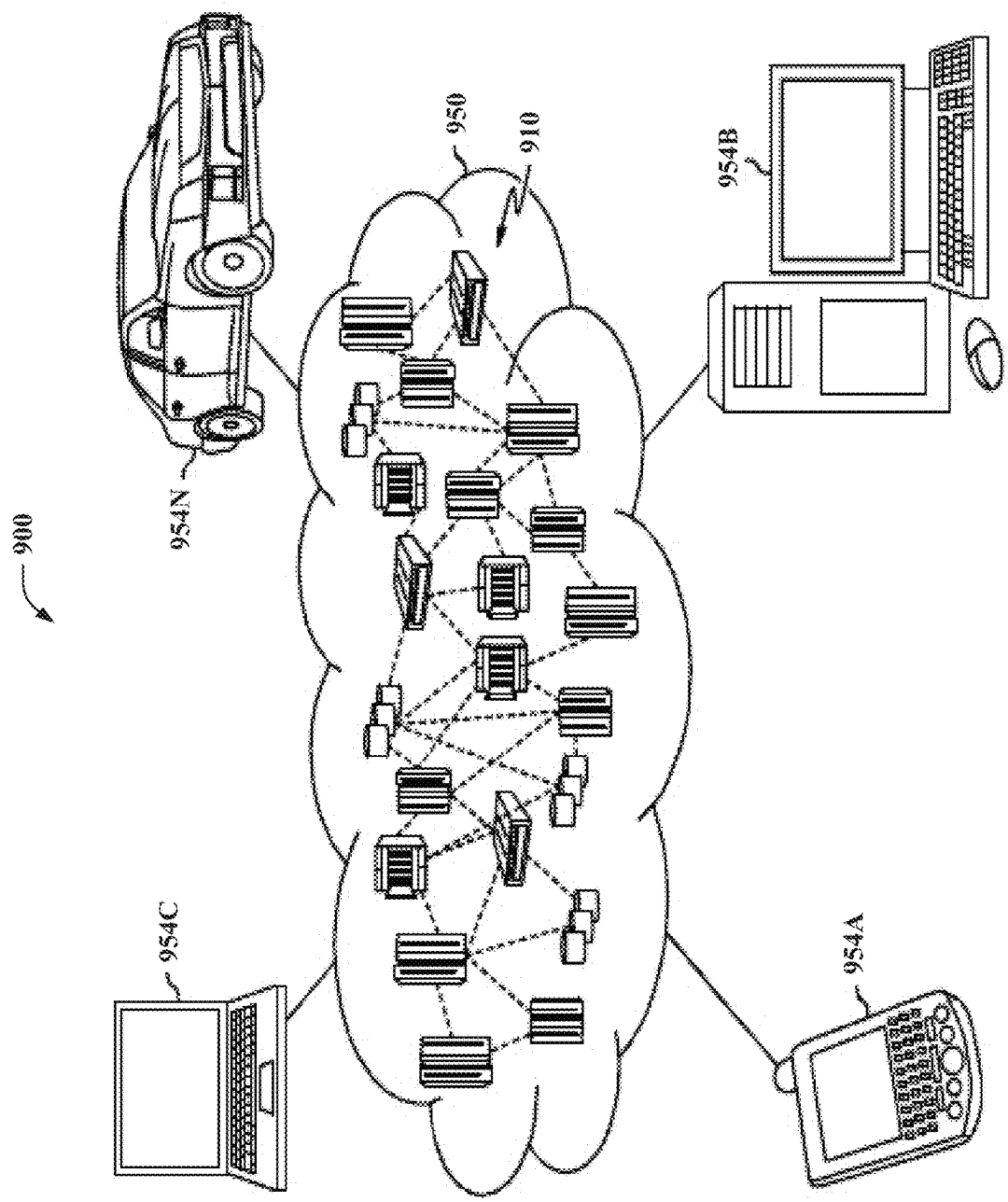
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
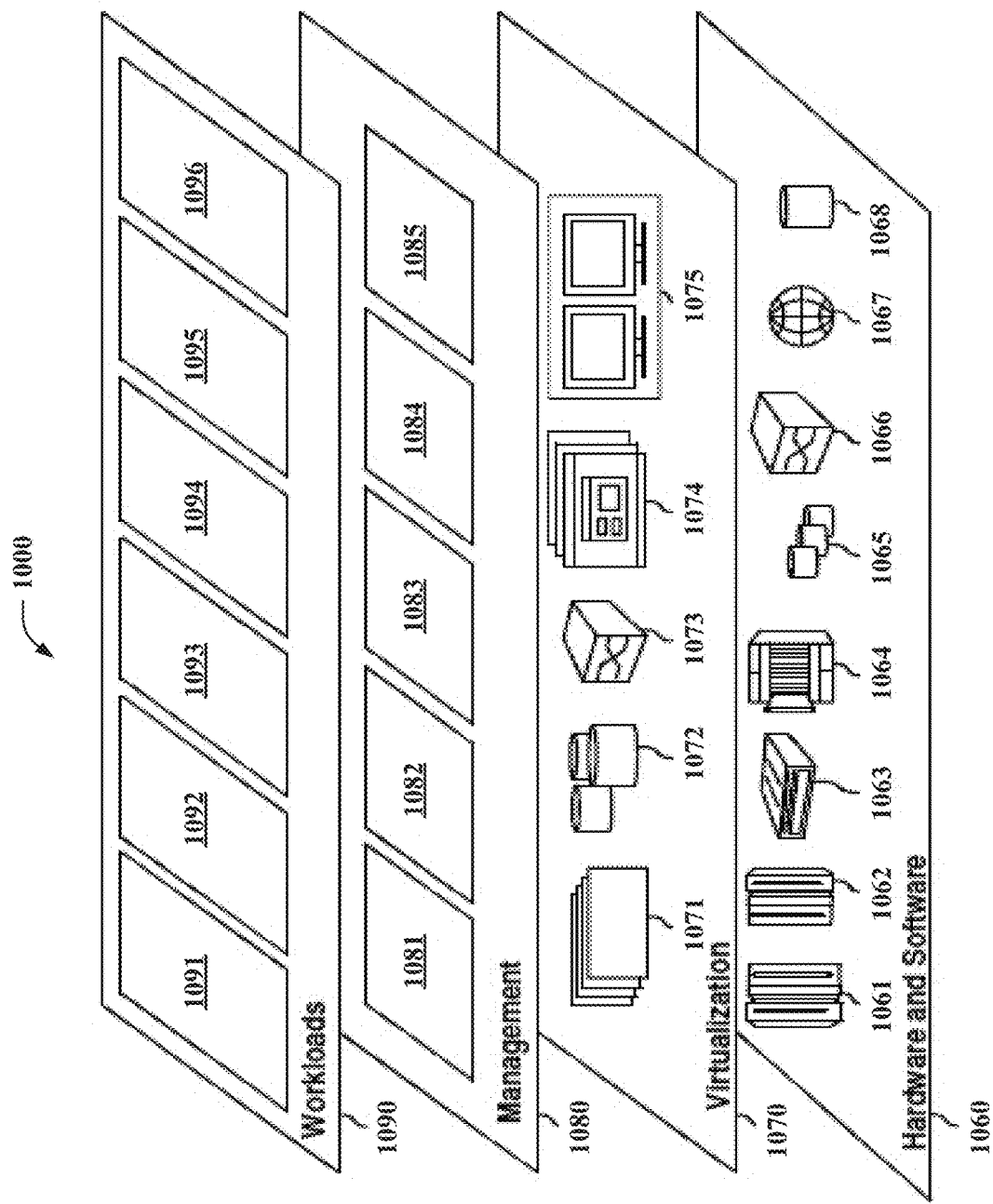
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and machine learning pipeline generation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by a system operatively coupled to a processor, a machine learning pipeline structure based on a pipeline grammar, wherein the generating comprises evaluating one or more machine learning pipeline structure candidates in a pipeline space defined by the pipeline grammar to generate the machine learning pipeline structure; and
selecting, by the system, one or more machine learning modules that achieve a defined objective to instantiate a machine learning pipeline based on the machine learning pipeline structure, wherein the one or more machine learning modules are selected based on a maximum pipeline length defined for the machine learning pipeline structure.

2. The computer-implemented method of claim 1, wherein the machine learning pipeline structure comprises a directed acyclic graph structured machine learning pipeline structure.

3. The computer-implemented method of claim 1, further comprising:
performing, by the system, a limited discrepancy search to select the one or more machine learning modules.

4. The computer-implemented method of claim 1, further comprising:
performing, by the system, a first limited discrepancy search based on a first search parameter value and one or more second limited discrepancy searches based on one or more second search parameter values to select the one or more machine learning modules.

5. The computer-implemented method of claim 1, further comprising:
performing, by the system, at least one of incremental training or incremental evaluation of an instantiated machine learning pipeline candidate using defined quantities of data samples in a dataset to select the one or more machine learning modules, thereby facilitating at least one of improved performance, improved efficiency, or reduced computational costs associated with at least one of the system or the processor in selecting the one or more machine learning modules.

6. The computer-implemented method of claim 1, further comprising:
tuning, by the system, one or more hyperparameters of one or more machine learning module candidates to select the one or more machine learning modules.

7. The computer-implemented method of claim 1, wherein the one or more machine learning modules are selected based further on a heuristic function.

8. A system, comprising:
a memory that stores computer executable components; and
a processor that executes the computer executable components stored in the memory, wherein the computer executable components comprise:
a pipeline structure generator component that generates a machine learning pipeline structure based on a pipeline grammar, wherein the pipeline structure generator component evaluates one or more machine learning pipeline structure candidates in a pipeline space defined by the pipeline grammar to generate the machine learning pipeline structure; and
a pipeline optimizer component that selects one or more machine learning modules that achieve a defined objective to instantiate a machine learning pipeline based on the machine learning pipeline structure, wherein the one or more machine learning modules are selected based on a maximum pipeline length defined for the machine learning pipeline structure.

9. The system of claim 8, wherein the machine learning pipeline structure comprises a directed acyclic graph structured machine learning pipeline structure.

10. The system of claim 8, wherein the pipeline optimizer component performs a limited discrepancy search to select the one or more machine learning modules.

11. The system of claim 8, wherein the pipeline optimizer component performs a first limited discrepancy search based on a first search parameter value and one or more second limited discrepancy searches based on one or more second search parameter values to select the one or more machine learning modules.

12. The system of claim 8, wherein the pipeline optimizer component performs at least one of incremental training or incremental evaluation of an instantiated machine learning pipeline candidate using defined quantities of data samples in a dataset to select the one or more machine learning modules, thereby facilitating at least one of improved performance, improved efficiency, or reduced computational costs associated with at least one of the system, the processor, or the pipeline optimizer component in selecting the one or more machine learning modules.

13. The system of claim 8, wherein the pipeline optimizer component tunes one or more hyperparameters of one or more machine learning module candidates to select the one or more machine learning modules.

14. The system of claim 8, wherein the one or more machine learning modules are selected based further on a heuristic function.

15. A computer program product facilitating an automated machine learning pipeline generation process, the computer program product comprising a computer readable storage medium having program instructions embodied therewith, the program instructions executable by a processor to cause the processor to:
generate, by the processor, a machine learning pipeline structure based on a pipeline grammar, comprising evaluation of one or more machine learning pipeline structure candidates in a pipeline space defined by the pipeline grammar to generate the machine learning pipeline structure; and
select, by the processor, one or more machine learning modules that achieve a defined objective to instantiate a machine learning pipeline based on the machine learning pipeline structure, wherein the one or more machine learning modules are selected based on a maximum pipeline length defined for the machine learning pipeline structure.

16. The computer program product of claim 15, wherein the machine learning pipeline structure comprises a directed acyclic graph structured machine learning pipeline structure.

17. The computer program product of claim 15, wherein the program instructions are further executable by the processor to cause the processor to:
  perform, by the processor, a limited discrepancy search to select the one or more machine learning modules.

18. The computer program product of claim 15, wherein the program instructions are further executable by the processor to cause the processor to:
  perform, by the processor, a first limited discrepancy search based on a first search parameter value and one or more second limited discrepancy searches based on one or more second search parameter values to select the one or more machine learning modules.

19. The computer program product of claim 15, wherein the program instructions are further executable by the processor to cause the processor to:
  perform, by the processor, at least one of incremental training or incremental evaluation of an instantiated machine learning pipeline candidate using defined quantities of data samples in a dataset to select the one or more machine learning modules.

20. The computer program product of claim 15, wherein the one or more machine learning modules are selected based further on a heuristic function.

\* \* \* \* \*